United States Patent
Blackwell

(10) Patent No.: US 7,519,580 B2
(45) Date of Patent: Apr. 14, 2009

(54) SEARCH CRITERIA CONTROL SYSTEM AND METHOD

(75) Inventor: Jason M. Blackwell, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 11/109,322

(22) Filed: Apr. 19, 2005

(65) Prior Publication Data
US 2006/0236216 A1 Oct. 19, 2006

(51) Int. Cl.
G06F 17/30 (2006.01)
(52) U.S. Cl. .................... 707/3; 707/4; 707/5
(58) Field of Classification Search ............... 707/1–5
See application file for complete search history.

(56) References Cited

U.S. PATENT DOCUMENTS

| | | | | |
|---|---|---|---|---|
| 5,220,625 | A * | 6/1993 | Hatakeyama et al. | 715/809 |
| 5,826,265 | A * | 10/1998 | Van Huben et al. | 707/8 |
| 5,983,216 | A * | 11/1999 | Kirsch et al. | 707/2 |
| 6,088,693 | A * | 7/2000 | Van Huben et al. | 707/8 |
| 6,195,651 | B1 * | 2/2001 | Handel et al. | 707/2 |
| 6,202,062 | B1 * | 3/2001 | Cameron et al. | 707/3 |
| 6,282,567 | B1 | 8/2001 | Finch, II et al. | |
| 6,297,824 | B1 | 10/2001 | Hearst et al. | |
| 6,314,423 | B1 | 11/2001 | Himmel et al. | |
| 6,324,566 | B1 | 11/2001 | Himmel et al. | |
| 6,453,315 | B1 * | 9/2002 | Weissman et al. | 707/5 |
| 6,513,031 | B1 * | 1/2003 | Fries et al. | 707/3 |
| 6,604,101 | B1 | 8/2003 | Chan et al. | |
| 6,615,248 | B1 | 9/2003 | Smith | |
| 6,643,641 | B1 * | 11/2003 | Snyder | 707/4 |
| 6,654,751 | B1 * | 11/2003 | Schmugar et al. | 707/10 |
| 6,768,997 | B2 * | 7/2004 | Schirmer et al. | 707/102 |
| 6,816,857 | B1 * | 11/2004 | Weissman et al. | 707/5 |
| 2001/0044758 | A1 * | 11/2001 | Talib et al. | 705/27 |
| 2003/0097357 | A1 * | 5/2003 | Ferrari et al. | 707/3 |
| 2003/0163453 | A1 * | 8/2003 | Yang et al. | 707/3 |
| 2004/0162765 | A1 * | 8/2004 | Reber | 705/26 |
| 2006/0026145 | A1 * | 2/2006 | Beringer et al. | 707/3 |

* cited by examiner

*Primary Examiner*—Don Wong
*Assistant Examiner*—Kim T Nguyen
(74) *Attorney, Agent, or Firm*—William E. Schlesser; Greenblum & Bernstein P.L.C.

(57) ABSTRACT

A method and system is provided for controlling search criteria when searching databases using active controls. In one aspect, a search criteria control bar (SCCB) displays results of a search by identifying category selections and keywords. Category selections may be identified by a unique delimiter and any keywords may also be identified by another unique identifier. A user may optionally narrow a search by selecting any active category or active keyword(s) that may be identified in the results summary by simply clicking on the appropriate choice. This may cause only those pages associated with the selected keyword or category to be displayed. Conversely, a user may alter a search by eliminating a keyword or category from the results by a one-click action. Further, the search and results may be limited by user preferences. In this manner, a user may be able to intuitively control searches with more refinement and efficiency.

26 Claims, 4 Drawing Sheets

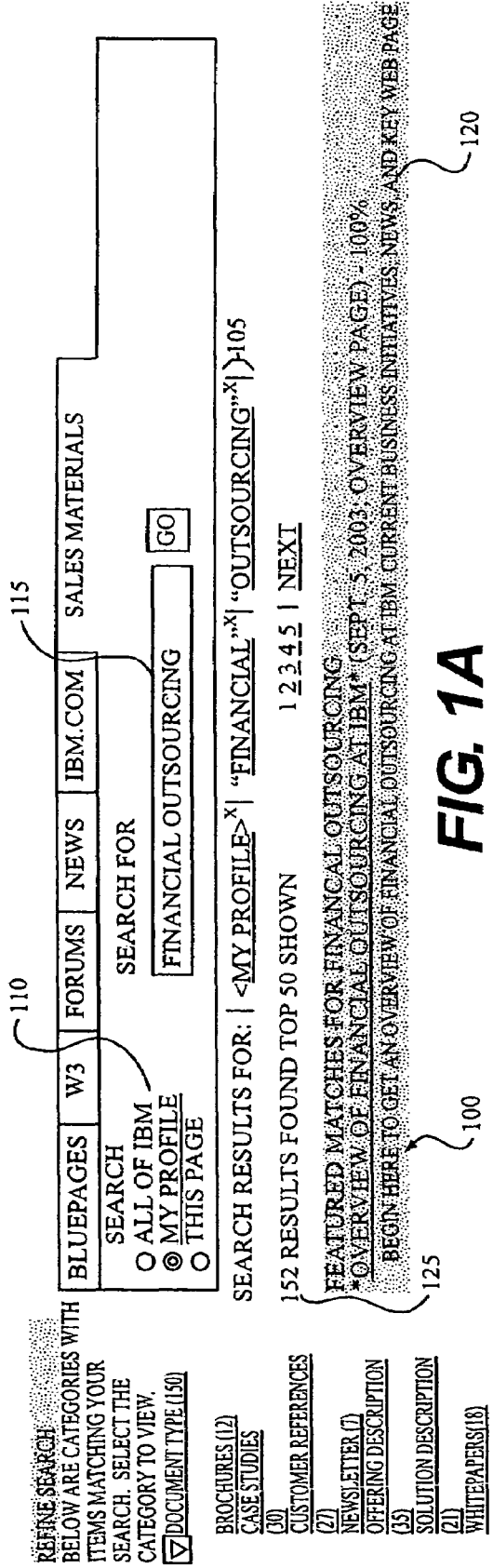
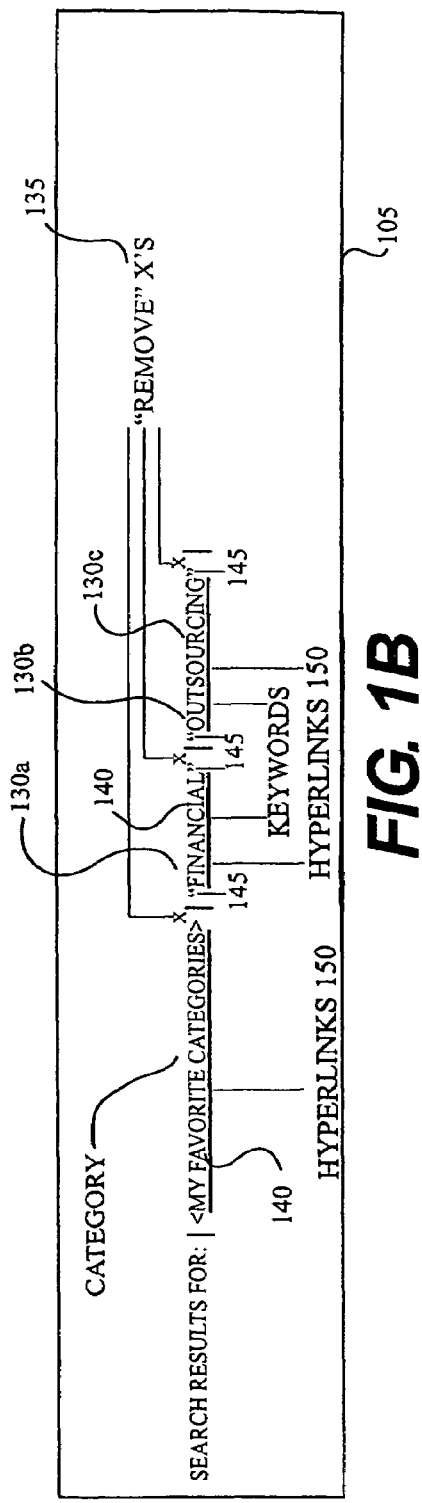
FIG. 1A
FIG. 1B

SEARCH RESULTS

| BLUEPAGES | W3 | PERSONA | FORUMS | NEWS | IBM.COM |

SEARCH FOR: [ +url:W3-1.ibm.com/hr+benefits ] [ GO ]  → ADVANCED SEARCH
→ HELP

SEARCH RESULTS FOR: | <YOU AND IBM IN W3>$^x$ | <HUMAN RESOURCES, NORTH AMERICA>$^x$ | "BENEFITS"$^x$ | "VISION"$^x$ | — 205

SEARCH RESULTS

| BLUEPAGES | W3 | PERSONA | FORUMS | NEWS | IBM.COM |

SEARCH FOR: [ BENEFITS ] [ GO ]

SEARCH RESULTS FOR: | "BENEFITS"$^x$ |
305

310 — 5731 RESULTS FOUND
TOP 500 SHOWN

SEARCH RESULTS

| BLUEPAGES | W3 | PERSONA | FORUMS | NEWS | IBM.COM |

SEARCH FOR: [ +url:W3-1.ibm.com/hr+visi ] [ GO ]  → ADVANCED SEARCH
→ HELP

SEARCH RESULTS FOR: | <YOU AND IBM IN W3>$^x$ | <HUMAN RESOURCES, NORTH AMERICA>$^x$ | "VISION"$^x$ |

405 — 167 RESULTS FOUND
TOP 167 SHOWN

SEARCH CRITERIA CONTROL SYSTEM AND METHOD

FIELD OF THE INVENTION

The invention generally relates to a system and method for controlling search criteria for searching databases such as web pages or documents and, more particularly, to a system and method for controlling searches using active controls.

There are several techniques provided by search engines to control the search criteria when searching by keywords or phrases in various types of databases. However there are at least three problematic aspects associated with these techniques including, for example:

(i) Substantial difficulties novice users have in using (and learning how to use) keyword searches on web pages effectively;

(ii) Summaries of search results have to accommodate faceted (e.g., metadata) searches; and (iii) Expert users do not have fast path techniques for quickly performing new searches by eliminating or focusing on particular criteria (including user search preferences or profiles).

In the case of novice users employing a keyword search, studies have shown that novice users (along with certain non-novice Internet users) have difficulties in understanding how to use keyword searches despite the fact that these types of searches seem almost ubiquitous on the Internet as demonstrated by the various search engines commonly available and retail sites (e.g., many sites provide internal site searches). Sample difficulties that people have include misunderstanding search methods, misunderstanding the interface, and difficulties in formulating their queries. For example, users are often ignorant or lack confidence in entering effective queries.

When a user or customer has difficulties performing searches on a particular site, the customer may develop a bad opinion of the company if they are unable to locate information they need, or more directly, sales may be lost if customers fail to find the appropriate product. Confusing or ineffective searching may quickly push a user to other alternatives such as other search engines or retail sites, thus resulting in potential loss of revenue.

One way that modern search results pages have attempted to address increasing efficiencies in searching have been through the use of faceted (or metadata) searches. These types of interfaces essentially provide for users to easily add criteria to a search to help quickly narrow the search results. This may be accomplished by not only providing lists of pages that match a keyword search, but also lists of categories that contain matching pages (the user can then select a category to narrow their search). For example, an initial search on a particular site for "violin" may return a section that summarizes the genres that have matches for "violin". This exemplary section may appear as shown in Table 1, below:

TABLE 1

REFINE SEARCH RESULTS
6,479 Matching Titles

By Genre

| | |
|---|---|
| ☐ Blues | ● Latin |
| ☐ Children's Age | ● New |
| ☐ Country | ● R&B |

Referring to Table 1, a user may select a category (e.g., Blues) that may quickly narrow the search (e.g., from 6,479 matches to 86). Faceted searches may help address users' lack of understanding of keyword searches and ability to produce effective queries by providing an obvious (and system-suggested) step of narrowing the search. It may also be noted that this technique essentially combines "browse" and "keyword search" approaches into a single screen. This may be a useful benefit, as users are also sometimes uncertain about the difference between browse and search.

Possible weaknesses of the faceted search approach, however, include (i) the fact that users need to be clear on the keyword and category selections that got them to this page, and (ii) that they use obvious techniques to narrow searches without obvious techniques of broadening the searches again. While faceted searches are relatively new and have not been thoroughly researched, these techniques do not provide simple operations to narrow results and then to broaden results again, as deemed necessary by a user.

Further, a common aspect of popular search engines typically involve a tendency to support additional searches by simply presenting a text box that contains the keyword(s) used in the initial search. They also tend to have text summaries of the search terms, which are either inactive controls or provide definitions for the terms. For example, suppose a user performs a search from the "You and IBM—Global" page within World Wide Web (w3) page (e.g., ibm.com/hr/global/) for "benefits vision". Currently, the search results may include a summary such as:

"W3 results for: +url:w3-1.ibm.com/hr+benefits+vision in HumanResources, North America"

This text summary reveals to the user information, including what w3 sub-page the user searched, the category searched (Human Resources, North America) and the keywords used (benefits and vision). It should be noted that the page and category were not expressly selected by the user, but assumed by the system. The user may become confused by this text summary since it is unclear what was category selections vs. keywords or how to change the search to obtain different results.

While these approaches are functional (they do allow a new keyword search), they do not provide fast paths for eliminating a term from the search (the user must enter the search box, delete the term, and search again). However, this may be perceived as an excessive amount of effort, therefore, an alternative should be provided that reduces user effort and task time, and increase user satisfaction.

SUMMARY OF THE INVENTION

In an aspect of the invention, a method is provided for displaying search information. The method comprises the steps of submitting a query having one or more search criterion, displaying a summary result of the query in a search criteria control bar (SCCB) format, wherein the SCCB format associates with each the one or more search criterion an active control for narrowing a search and another active control for expanding a search with a one-click operation and initiating another query when either active control for narrowing or expanding is clicked to obtain another summary result in the SCCB format reflecting results of the another query based on the active control that is clicked.

In another aspect of the invention, an apparatus for displaying search information is provided. The apparatus comprises means for displaying a summary result of a query in a search criteria control bar (SCCB) format having one or more search criterion, an active control for narrowing a search and an active control for expanding a search with a one-click operation and means for initiating another query when either active control is clicked to obtain another summary result in the SCCB format reflecting results of the another query based on the active control that is clicked.

In another aspect of the invention, a computer program product is provided. The computer program comprises a computer usable medium having readable program code embodied in the medium. The computer program product has at least one component to submit a query having one or more search criterion and to display a summary result of the query in a search criteria control bar (SCCB) format, wherein the SCCB format associates with each the one or more search criterion an active control for narrowing a search and another active control for expanding a search with a one-click operation. The computer program product also includes the at least one component to initiate another query when any of the active controls is clicked to obtain another summary result in the SCCB format reflecting results of the another query based on the active control that is clicked.

BRIEF DESCRIPTION OF THE DRAWINGS

FIG. 1A is an illustration of an embodiment of a search criteria control bar (SCCB) as part of a search results page;

FIG. 1B is an embodiment of a SCCB showing parts of the SCCB;

FIG. 2 is an embodiment of a results page, in SCCB format;

FIG. 3 is an illustrative embodiment of a results page showing results of clicking on a criterion;

FIG. 4 is an illustrative embodiment of a results page showing the results of clicking on an "X" filter;

DETAILED DESCRIPTION OF EMBODIMENTS OF THE INVENTION

Figure 5:
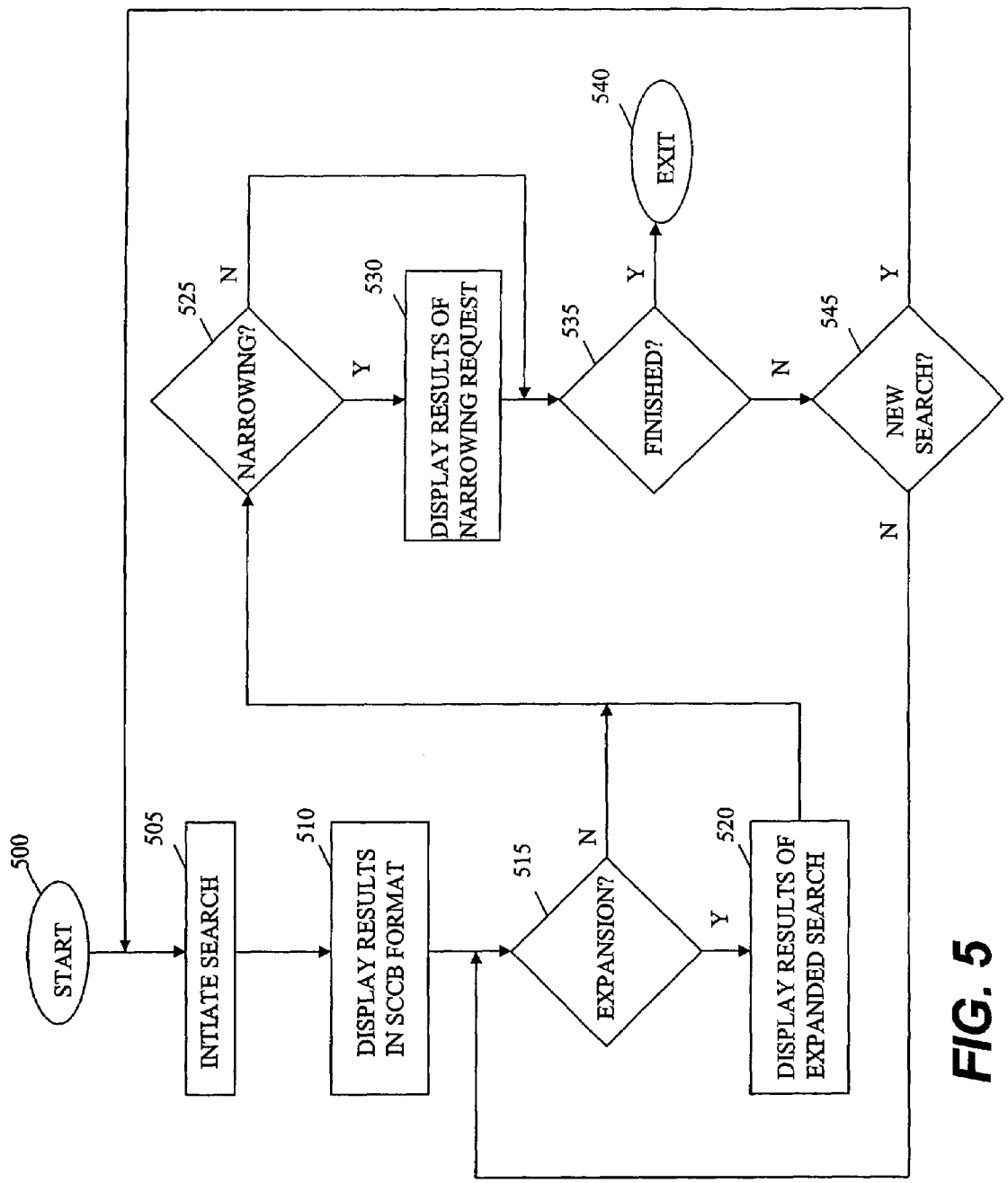
FIG. 5 is a flow diagram of an embodiment showing steps of the invention.

The invention is directed to a system and method for controlling search criteria when searching databases using active controls. In one aspect, the invention provides a Search Criteria Control Bar (SCCB), an example of a SCCB and its format is shown in Table 2, comprising a list of criteria that a user may have employed to obtain a current list of search results and may be displayed on a search results page when performing a search query, for example with a browser. The SCCB may be used to easily modify a new search by suppressing, adding, or combining search terms.

TABLE 2

Search Results for: |<My Profile>$^X$|"financial"$^X$|"outsourcing"$^X$|

Thus, the SCCB provides a user interface that may compliment any type of search results page. The SCCB requires essentially the same amount of space as an inactive text summary, but provides additional functionality. The SCCB example of Table 2 is meant to be illustrative of one example and one of ordinary skill in the art would recognize that other forms may be employed and are contemplated by the invention.

In addition to being a list of criteria, the SCCB, as shown in Table 2, provides the following features:

(i) Simple, space-saving indicators of whether the criteria is a category selection (e.g., My Profile as delimited with brackets < >) or keyword search (e.g., financial and outsourcing, each delimited with quotes " ").

(ii) An ability to see all the results for a single criterion (i.e., removing all other criteria) with a single click (e.g., by clicking on the criterion of interest).

(iii) An ability to remove a criterion and see the search results for the remaining criteria with a single click (e.g., by clicking the "X" next to the criterion one wishes to remove). This may expand the number of hits since the number of search terms is reduced.

The SCCB addresses several of the previously discussed problems in several ways including, for example:

For novice users employing keyword searches, the SCCB clearly summarizes how the user navigated to the displayed search results (including accommodating both keyword searches and category selections in faceted searches). This may aid in the users understanding the mechanics and methodology of searching. Additionally, the SCCB provides for a one-click action and visual cues on ways that a user might broaden a search (by selecting a single criteria or removing a criterion).

For supporting faceted searches, a visual differentiation of category selections and keyword searches is provided along with an easy process of broadening searches or removing criterion after using a faceted search to narrow the results.

For fast paths, even experienced users may typically be faster in removing search criteria using the SCCB than editing a keyword text box and re-searching the new or modified terms. In fact, in some cases the time savings may be quite substantial when applied creatively. In the example above, the user may have performed a search within their profile (i.e., a saved list of search preferences; e.g., search North America, usability documents, or the like). The user could quickly perform another search of the entire database (rather than just within their search preferences) by clicking the X near 'My Profile'.

FIG. 1A is an illustration of an embodiment of a SCCB as part of a search results page, where the search results page generally denoted by reference numeral 100. The SCCB 105 (as similarly shown previously in Table 2) has a number of active controls, as discussed in reference to FIG. 2, that a user may employ which is significantly unique when compared to traditional text. The search results page 100 may also employ selectable options 110 to limit a search and may include options such as "My Profile" that limits a search according to a predefined profile established by a user. The options may also include "All of X" where searches may be limited to a matches involving "X", in this illustration "X" is "IBM". Or, the search may be limited to matches on "This page". As with many search engines, a search may be initiated by entering keywords in a search field 115 with results 120 presented along with a summary line 125.

FIG. 1B is an embodiment of a SCCB showing parts of the SCCB. The SCCB includes one or more criteria 130a, 130b, and 130c. The SCCB 105 also provides for the ability to see all the results for a single criterion, such as, for example, 130a, (i.e., removing all other criteria, such as 130b and 130c) with a single click (by clicking the criterion of interest, 130a).

Conversely, the SCCB 105 also provides an ability to remove a criterion and see the search results for the remaining criteria with a single click (by clicking the "X" 135 next to the criterion one wishes to remove). Furthermore, SCCB supplies special notation (e.g., the set of brackets 140 and the set of quotes 145) that especially supports modern faceted searches by indicating category selections (e.g., brackets 140) vs. keyword searches (e.g., quotes 145). Of course, it should be apparent that only one set of quotes would be necessary if only one keyword is involved, or multiple sets of brackets if multiple keywords are involved. Likewise, if multiple sets of categories are involved, then multiple sets of brackets are likewise used to delimit the categories.

SCCB Operations

Search Criteria Control Bar's Initial State

The SCCB may appear on a search results page after the user has either performed a keyword search or selected a category that produces the search results page 100. The initial state may include a summary of any categories selected and any keywords entered (typically maintaining the appropriate ordering, such as keeping keywords in the order that the user entered them). Each category or keyword has one or more field separators to make it distinct from the others (e.g., the character "|"). Also each category (e.g., 130a) or keyword (e.g., 130b or 130c) may be an underlined hyperlink 150 (the selection of which shows search results for that criterion alone), and each category or keyword has an "X" 135 to the upper right or other convenient location for filtering. The selection of the "X" shows search results for the remaining criteria without the selected criterion, i.e., it eliminates the criterion from the search.

FIG. 2 is an embodiment of a results page, in SCCB format, the results page generally denoted by reference numeral 200. The SCCB format 205 shows results using a previously discussed example, namely, a user performs a search from the "You and IBM in w3" page on the World Wide Web (w3) (e.g., ibm.com/hr/global/) and searching for "benefits vision." The resulting SCCB format is much clearer and more functional than text only searches. The categories searched are clearly distinguished as "<You and IBM in w3>" and "<Human Resources, North America>", as are the keywords "benefits" and "vision."

Adding Items to the Search Criteria Control Bar

Whenever a new search is performed, the SCCB is typically updated. Adding search criteria of course adds items to the control bar. Suppose, following the previous example, the user adds a new keyword "plan" in the keyword text box and clicks the Go button to perform another search, the resulting search summary may appear as shown in Table 3 (actual hits for the 85 results are not shown but are not necessary to understand the invention, and would typically be listed accordingly):

TABLE 3

Search Results for: |<You and IBM in w3>$^X$|<Human Resources, North America>$^X$|"benefits"$^X$|"vision"$^X$|"plan"$^X$|
85 results found
Top 85 shown Displaying Search Results for a Single Criterion Users may see the search results for a single criterion by clicking the criterion, itself. In the above example of Table 3, the search illustratively shows 85 matched pages. If the user so desires, the user may see the results of "benefits" alone for all of w3 simply by clicking "benefits" (an active keyword) in the SCCB.

FIG. 3 is an illustrative embodiment of a results page showing the results of clicking on a criterion, generally denoted by reference numeral 300. Here the search keyword 305 has been altered to "benefits" only and that the total number of matches 310 has increased to 5731 since there is only one search criterion instead of four. Likewise, a selection may have been made on any active category (e.g., a word delimited by "< >" with hyperlink) to cause search results for the category to be displayed.

Removing a Search Criterion

Users may "remove" a criterion (that is, see the search results for all the criteria except the selected one) by clicking the "X" (e.g., reference numeral 135) next to the criterion they wish to remove. In the example of Table 3, the search matched 85 pages. If the user so desires, the user may elect to see the search results of all the criteria except for "benefits" simply by clicking the "X" near "benefits" in the SCCB.

FIG. 4 is an illustrative embodiment of a results page showing the results of clicking on an "X" filter, generally denoted by reference numeral 400. Note that this leads to a slightly higher number of matches (167 instead of 85) in the results found summary 405, since there is only three search criterion instead of four.

Figure 6:
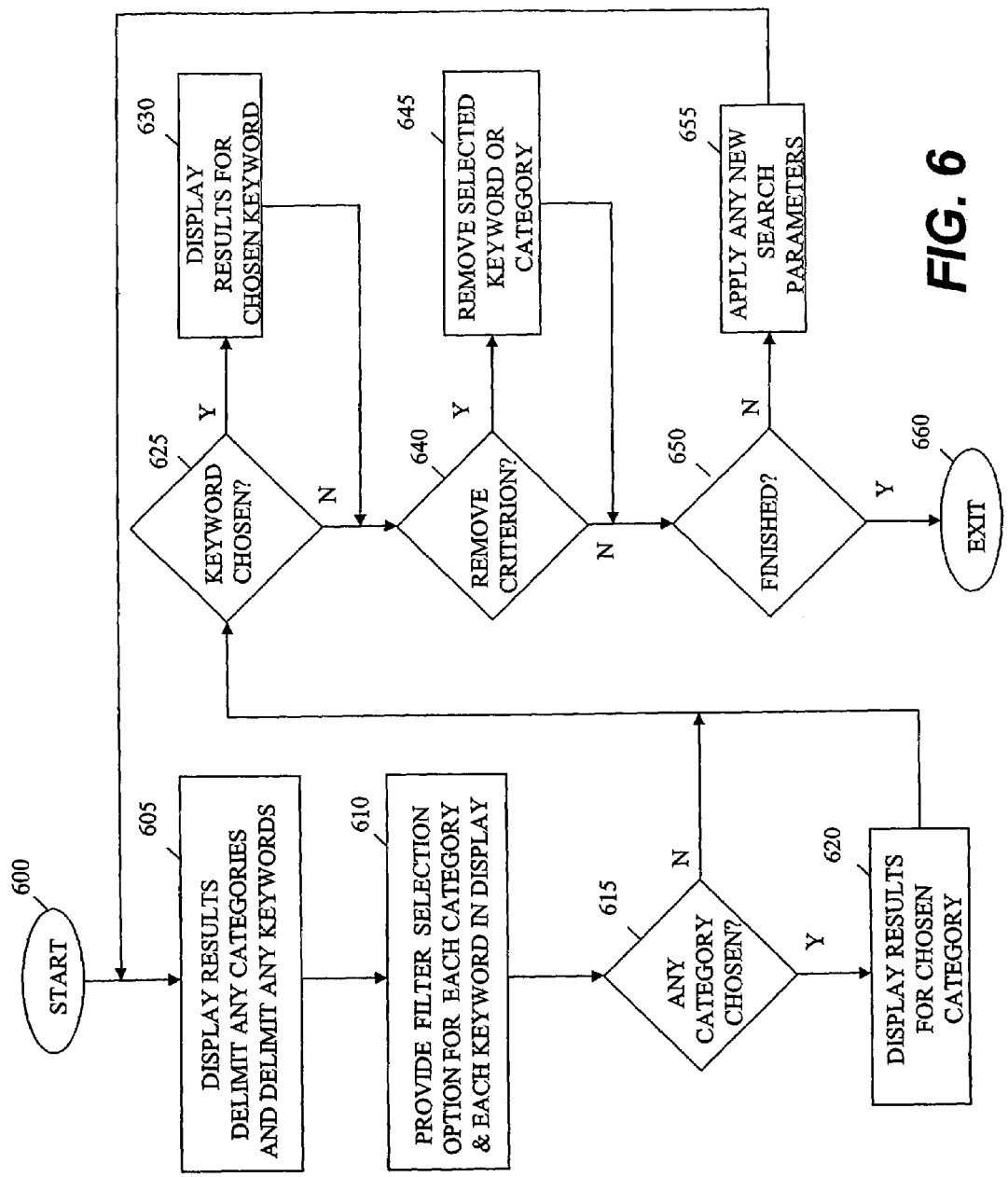
FIG. 6 is a flow diagram of an embodiment showing steps of the invention.

FIG. 5 is a flow diagram of an embodiment showing steps of the invention, beginning at step 500. FIGS. 5 and 6 may equally represent a high-level block diagram of components of the invention implementing the steps thereof. The steps of FIGS. 5 and 6 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Continuing with FIG. 5, at step 505, a search or query may be initiated by a user for one or more keywords and/or categories. The search may be limited to specific domains or web sites perhaps specified by a user profile. At step 510, the results of the search are displayed in SCCB format which may include one or more categories and/or one or more keywords. The one or more categories may be delimited by a unique delimiter for easy recognition by a user. The one or more keywords may also be delimited by a unique delimiter for easy recognition by a user. Each category and keyword may also include a filter option for eliminating a particular category or keyword as chosen by a user.

At step 515, a check is made whether the user has selected to expand the search results by excluding a category or keyword. This may be accomplished by selecting a filter option associated with a category or keyword, such as, for example, a "X" superscript. If an expansion has been selected, then at step 520, results of the expanded search may be displayed according to the user's selection and processing continues at step 525. If, however, no expansion has been selected, then at step 525, a check may be made whether the user has selected an option to narrow results by selecting a keyword or category, typically by a one-click operation to select the keyword or category. If so, then at step 530, the results of the narrowed selection may be displayed. Processing continues at step 535.

If, however, no selection for narrowing has been made by the user, then at step 535, a check may be made whether the user has terminated the searching or query mode and, if so, then at step 540, the process exits. But, if not terminated, then at step 545, a check may be made to determine if the user has entered new or different search parameters such as, for example, new keywords or search limitations (e.g. a user profile selection or a focused search selection such as "This page") If so, then processing continues at step 505. Otherwise, if not, then processing continues at step 515 to continue checking whether the user may have selected any active control.

FIG. 6 is a flow diagram showing steps of using the invention, beginning at step 600. At step 605, results from a request search may be displayed with any categories and/or keywords delimited by unique delimiters, for example, brackets for categories and quotes for keywords, although other unique delimiters may be used as one of ordinary skill in the art would recognize.

At step 610, filter selection options, such as, for example, a superscript "X" may be provided along with each category or keyword result, although any similar filter selection option may be employed as one of ordinary skill in the art may recognize. The categories and/or keywords may typically be arranged in an order reflecting the order of words entered by the user and separated by a separation delimiter, such as for example a "|" character.

At step 615, a check may be made to determine whether any category has been chosen (i.e., selected, typically a one-click operation) by the user for actively altering the displayed search results to reflect the chosen category and removing any and all other category or keyword from the search results. If so, the search results for the chosen category may be displayed and processing continues at step 625. If no category has been chosen, then at step 625, a check may be made to determine whether a keyword has been chosen (typically by a one-click operation) by the user. If so, then at step 630, search results for the chosen keyword may be displayed, without any other category or other keyword included. Otherwise, if not, then processing continues at step 640.

At step 640, a check is made to determine whether a criterion has been selected for suppression (e.g., removal, typically by a one-click operation) during a search. If so, the selected keyword or category may be suppressed during a search query and the new results displayed and processing continues with step 650. Otherwise, if a criterion has not been selected for removal, then at step 650, a check may be made to determine if the user has completed the searching mode. If not, then the process continues at step 655 where another search may be initiated, perhaps with new search parameters. But, if the user has completed the search mode, then at step 660, the process ends While the invention has been described in terms of embodiments, those skilled in the art will recognize that the invention can be practiced with modifications and in the spirit and scope of the appended claims.

What is claimed is:

1. A method of displaying search information implemented in a computer infrastructure having computer executable code, comprising the steps of:
   submitting a query having one or more search criterion;
   displaying a summary result of the query in a search criteria control bar (SCCB) format, wherein the SCCB format includes each of the one or more search criterion having a first active control for editing the query with a one-click operation and a second active control for editing the query with another one-click operation;
   initiating a submission of another query when either the first or second active control is clicked to obtain another summary result in the SCCB format reflecting results of the another query based on which active control is clicked;
   displaying the summary result and the another summary result in the SCCB format, wherein the one or more search criterion includes at least any one of one or more category words or phrase each delimited by a set of category delimiters and one or more keywords or phrase each delimited by a set of keyword delimiters;
   displaying the one or more search criterion each having an associated filter option for removing a chosen search criterion from the one or more search criterion when the another query is initiated, the associated filter option being the second active control; and
   removing the chosen search criterion when the associated filter option is clicked and initiating the submission of the another query using any remaining one or more search criterion causing the results of the another query to be limited to the remaining one or more search criterion.

2. The method of claim 1, wherein the set of category delimiters is a set of brackets.

3. The method of claim 1, further comprising delimiting the one or more category words or phrase each with at least one field separator.

4. The method of claim 3, wherein the field separators is a "|" character.

5. The method of claim 1, wherein the another query causes the amount of results to be one of an expanded number of results and an equal number of results.

6. The method of claim 1, wherein the set of keyword delimiters is a set of quotes.

7. The method of claim 1, further comprising delimiting the one or more keywords or phrase each with at least one field separator.

8. The method of claim 1, wherein the first active control is at least any one of an active category and an active keyword.

9. The method of claim 8, wherein the active category is a category word or phrase and when selected narrows the results of the another query to only the topic of the selected active category and the active keyword is a keyword or phrase and when selected narrows the results of the another query to only the topic of the selected active keyword.

10. The method of claim 8, wherein the first active control when selected causes the number of results of the another query to be increased.

11. The method of claim 1, wherein the first active control is indicated by a hyperlink.

12. The method of claim 1 further comprising limiting the query based on a user profile.

13. An apparatus for displaying search information, comprising:
   means for displaying a summary result of a query having one or more search criterion in a search criteria control bar (SCCB) format, wherein the SCCB format includes each of the one or more search criterion having a first active control for editing the query with a one-click operation and a second active control for editing the query with another one-click operation;
   means for initiating a submission of another query when either the first or second active control is clicked to obtain another summary result in the SCCB format reflecting results of the another query based on which active control is clicked;
   a means for displaying the one or more search criterion each having an associated filter option for removing a chosen search criterion from the one or more search criterion when the another query is initiated, the associated filter option being the second active control; and
   a means for removing the chosen search criterion when the associated filter option is clicked and initiating the submission of the another query using any remaining one or more search criterion causing the results of the another query to be limited to the remaining one or more search criterion.

14. The apparatus of claim 13, further comprising a means for displaying the summary result and the another summary result in the SCCB format wherein the one or more search criterion includes at least any one of one or more category words or phrase each delimited by a set of category delimiters and one or more keywords or phrase each delimited by a set of keyword delimiters.

15. The apparatus of claim 14, wherein the set of category delimiters is a set of brackets.

16. The apparatus of claim 14, further comprising a means for delimiting the one or more category words or phrase with at least one field separator.

17. The apparatus of claim 16, wherein the field separator is a "|" character.

18. The apparatus of claim 14, wherein the set of keyword delimiters is a set of quotes.

19. An apparatus for displaying search information, comprising:
    means for displaying a summary result of a query having one or more search criterion in a search criteria control bar (SCCB) format, wherein the SCCB format includes each of the one or more search criterion having a first active control for editing the query with a one-click operation and a second active control for editing the query with another one-click operation; and
    means for initiating a submission of another query when either the first or second active control is clicked to obtain another summary result in the SCCB format reflecting results of the another query based on which active control is clicked,
    wherein the another query causes a number of results to be one of an expanded number of results and an equal number of results.

20. The apparatus of claim 13, further comprising a means for delimiting the one or more keywords or phrase each with a set of field separators.

21. The apparatus of claim 13, wherein the first active control is at least any one of an active category and an active keyword.

22. The apparatus of claim 21, wherein the active category is a category word or phrase and when selected narrows the results of the another query to only the topic of the selected active category and the active keyword is a keyword or phrase and when selected narrows the results of the another query to only the topic of the selected active keyword.

23. The apparatus of claim 21, wherein the first active control when selected causes the number of results of the another query to be increased.

24. The apparatus of claim 13, wherein the first active control is indicated by a hyperlink.

25. The apparatus of claim 13, further comprising a means for limiting the query based on a user profile.

26. A computer program product comprising a computer usable medium having readable program code embodied in the medium, the computer program product having at least one component to:
    submit a query having one or more search criterion;
    display a summary result of the query in a search criteria control bar (SCCB) format, wherein the SCCB format includes each of the one or more search criterion having a first active control for editing the query with a one-click operation and a second active control for editing the query with another one-click operation;
    initiate a submission of another query when either the first or second active control is clicked to obtain another summary result in the SCCB format reflecting results of the another query based on which active control is clicked;
    display the summary result and the another summary result in the SCCB format, wherein the one or more search criterion includes at least any one of one or more category words or phrase each delimited by a set of category delimiters and one or more keywords or phrase each delimited by a set of keyword delimiters;
    display the one or more search criterion each having an associated filter option for removing a chosen search criterion from the one or more search criterion when the another query is initiated, the associated filter option being the second active control; and
    remove the chosen search criterion when the associated filter option is clicked and initiating the submission of the another query using any remaining one or more search criterion causing the results of the another query to be limited to the remaining one or more search criterion.

* * * * *